R. M. NELSON.
AUTOMOBILE FENDER.
APPLICATION FILED DEC. 1, 1916.

1,229,124.

Patented June 5, 1917.

Inventor
Robert M. Nelson
By Whittemore Hulbert & Whittemore
Attorneys

UNITED STATES PATENT OFFICE.

ROBERT M. NELSON, OF DETROIT, MICHIGAN, ASSIGNOR OF THREE-FOURTHS TO MARY PHILLIPS AND ONE-FOURTH TO GEORGE W. MASKERS, BOTH OF DETROIT, MICHIGAN.

AUTOMOBILE-FENDER.

1,229,124.  Specification of Letters Patent.  Patented June 5, 1917.

Application filed December 1, 1916. Serial No. 134,292.

*To all whom it may concern:*

Be it known that I, ROBERT M. NELSON, a citizen of the United States of America, residing at Detroit, in the county of Wayne and State of Michigan, have invented certain new and useful Improvements in Automobile-Fenders, of which the following is a specification, reference being had therein to the accompanying drawings.

This invention relates to automobile fenders and refers more particularly to a new and improved manner of supporting and reinforcing fenders.

Among the objects of the invention are to provide a construction whereby the fender will be so supported at its end that an ordinary blow on the end of the fender will not completely demolish the end of the fender; to so construct and arrange the support that it will directly reinforce the vizor or front end of the fender; to provide a construction in which the portion of the fender directly in the rear of the support will be free to give or flex under the impact of a blow and thus spring back into shape without permanent injury to the fender.

The invention also resides in such details of construction and arrangements and combinations of parts as will more fully hereinafter appear.

Figure 1:
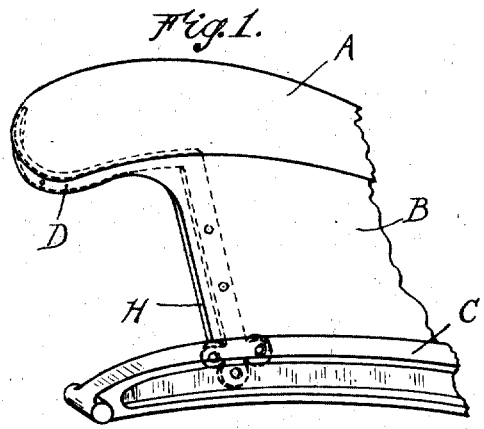
Figure 1 is a perspective view of a fender embodying my invention.

Describing in detail the particular construction shown in the drawings, A designates the fender which has an apron B extending down toward the side sill C of the automobile frame. The fender A is preferably curved and provided at its front end with a downwardly turned flange or vizor D.

Heretofore in supporting fenders of this type the bracket or other supporting member has been located rearwardly from the flange D a considerable distance, and in case of a collision or other blow on the end of the fender the vizor and other front portions of the fender would be bent entirely out of shape, so as to require a new fender or extensive repairs.

The present invention, however, contemplates a construction whereby the bracket or supporting member E extends forward and directly reinforces the flange or vizor D. In detail this bracket or supporting member E comprises an upright portion F having a cloverleaf or other supporting portion G which is connected to the side sill at a point just in the rear of the apron edge H. At its upper end the upright F is bent to provide a forwardly extending portion I terminating in a curved portion J. The latter is preferably of a shape to fit directly inside of the flange or vizor D and may be secured thereto by rivets or any other suitable securing means.

Figure 2:
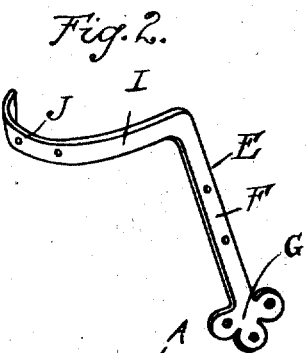
Fig. 2 is a perspective view of the fender support detached.
Figure 3:
Fig. 3 is a vertical section through the construction shown in Fig. 1.
Figure 4:
Fig. 4 is a similar section showing a slightly modified construction.
Figure 5:
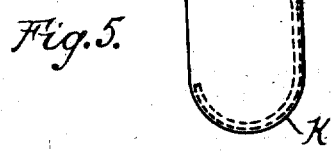
Fig. 5 is a top plan view of the construction shown in Fig. 4.

In certain constructions of fenders the flange D is omitted and the forward end of the fender curved down as indicated at K in Fig. 4. With such constructions the the curved reinforcing portion J is used in the same manner as described in connection with Figs. 1 to 3 but is made to conform to the shape of the forward end of the fender, as shown in Figs. 4 and 5. In either case the supporting member or bracket forms a direct reinforcement for the flanged end of the fender, while the portion in the rear of the front is free to flex. There will be sufficient give to the metal forming the fender to permit it to flex under the impact of a blow and spring back into shape without permanent injury to the fender. Thus a blow which would generally demolish the front end of the fender is taken care of by the novel construction of supporting and reinforcing member above described.

While I have shown a reinforcing member as formed of a flat strip of metal, it is obvious that it could be of circular or other cross section, and various changes made within the scope of my invention.

What I claim as my invention is:

1. The combination with a fender having a curved portion and a depending front flange, of a support therefor extending beneath the curved portion directly adjacent the flanged end.

2. The combination with a fender having a curved portion and a depending front flange, of a support therefor extending beneath the curved portion directly adjacent the flanged end, and having a flange fitting inside of the fender flange.

3. The combination with a fender having a curved portion and a depending front flange, of a support therefor extending beneath the curved portion directly adjacent the flanged end, and having a flange fitting inside of the fender flange, the fender having a portion of lesser resistance located in the rear of the supported portion.

In testimony whereof I affix my signature.

ROBERT M. NELSON.